United States Patent [19]

Sokol

[11] Patent Number: 5,380,517
[45] Date of Patent: Jan. 10, 1995

[54] PROCESS FOR CONTINUOUSLY PRODUCING CHLORINE DIOXIDE

[75] Inventor: John C. Sokol, Marietta, Ga.

[73] Assignee: Eka Nobel Inc., Marietta, Ga.

[21] Appl. No.: 23,561

[22] Filed: Feb. 26, 1993

[51] Int. Cl.$^6$ .............................................. C01B 11/02
[52] U.S. Cl. .................................. 423/478; 252/187.21
[58] Field of Search ...................... 423/478; 252/187.21

[56] References Cited

U.S. PATENT DOCUMENTS

| | | | |
|---|---|---|---|
| 2,332,181 | 10/1943 | Soule | 423/478 |
| 2,484,402 | 10/1949 | Day et al. | 423/478 |
| 2,833,624 | 5/1958 | Sprauer | 423/478 |
| 3,341,287 | 9/1967 | Scribner | 423/478 |
| 3,341,288 | 9/1967 | Partridge | 423/478 |
| 3,563,702 | 2/1971 | Partridge | 423/478 |
| 4,081,520 | 3/1978 | Swindells et al. | 423/478 |
| 4,129,484 | 12/1978 | Larsson | 423/478 |
| 4,421,730 | 12/1983 | Isa et al. | 423/478 |
| 5,091,166 | 2/1992 | Engström et al. | 423/478 |
| 5,091,167 | 2/1992 | Engström et al. | 423/478 |

FOREIGN PATENT DOCUMENTS 63-8203  1/1988  Japan .................................. 423/478

OTHER PUBLICATIONS

Abstract, European Patent Office, WPI, Section Ch, Week 9126, Derwent Publications, London, GB; Class E36, AN 91–188766 & JP-A-3 115 102 (Daiso Co Ltd) 16 May 1991.

*Primary Examiner*—Gary P. Straub
*Assistant Examiner*—N. M. Nguyen
*Attorney, Agent, or Firm*—Burns, Doane, Swecker & Mathis

[57] ABSTRACT

A process for continuously producing chlorine dioxide by reacting an alkali metal chlorate, sulfuric acid or another chlorine free mineral acid and hydrogen peroxide as reducing agent to produce chlorine dioxide in an aqueous reaction medium. In the process chlorine dioxide is generated in at least one reaction step comprising at least one reaction vessel, by feeding alkali metal chlorate, acid, hydrogen peroxide and inert gas to said reaction vessel, in substantial absence of added chloride ions. The aqueous reaction medium in said reaction vessel is maintained at a pressure of from about 400 mm Hg to about 900 mm Hg and at a temperature of from about 35° C. to about 100° C. and at an acidity within a range from about 4 to about 14 N and the chlorate concentration of between about 0.05 moles/1 to saturation. Chlorine dioxide, oxygen and inert gas and the depleted aqueous reaction medium is withdrawn from said reaction zone without substantial crystallization of alkali metal sulfate.

12 Claims, No Drawings

PROCESS FOR CONTINUOUSLY PRODUCING CHLORINE DIOXIDE

BACKGROUND OF THE INVENTION

The present invention relates to a process for continuously producing chlorine dioxide from an alkali metal chlorate sulfuric acid or another chlorine free mineral acid and hydrogen peroxide as reducing agent at a pressure from about 400 mm Hg to about 900 mm Hg, preferably at atmospheric pressure. In particular the invention provides an efficient process with high yield of chlorine dioxide and with essentially no chlorine by-product.

Chlorine dioxide in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced- Considerable research is also directed to the handling of by-products such as chlorine and mineral acid salts.

A number of different processes for producing chlorine dioxide are known in the art. Several processes use the same raw materials and produce the same sort of residual products at the same reaction conditions. The only difference is the reducing agent.

Alkali metal chlorate and sulfuric acid is brought continuously to a reaction vessel to which air and the reducing agent are introduced, usually into the bottom of the vessel. Then chlorine dioxide and air leave from the top of the reaction vessel and a depleted reaction solution is withdrawn for further treatment. It is common to use more than one vessel whereby the depleted reaction solution from the first vessel is brought to a second (and further) vessel together with air and reducing agent for further conversion of the remaining chlorate. The reaction in the reaction vessel/s is carried out at about atmospheric pressure. Reducing agents used in this type of reaction are sulfur dioxide (the Mathieson process), methanol (the Solvay process) and chloride ions (the R-2 process). The basic chemical reaction involved in the process with chloride ions can be summarized with the formula:

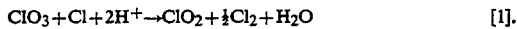
$$ClO_3^- + Cl^- + 2H^+ \rightarrow ClO_2 + \tfrac{1}{2}Cl_2 + H_2O \qquad [1].$$

The other reducing agents are indirect reducing agents, the direct reaction between chlorate ions and methanol or sulfur dioxide being very slow. The direct reducing agent in these cases are chloride ions reacting according to [1]. The chlorine produced is then reacting with methanol to regenerate chloride ions according to the formula:

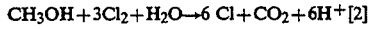
$$CH_3OH + 3Cl_2 + H_2O \rightarrow 6\ Cl^- + CO_2 + 6H^+ \qquad [2]$$

or with sulfur dioxide according to the formula:

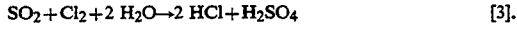
$$SO_2 + Cl_2 + 2\ H_2O \rightarrow 2\ HCl + H_2SO_4 \qquad [3].$$

As is evident from [1] a large amount of chlorine is produced as a by-product when chloride ions are used as reducing agent. To reduce the amount of chlorine by-product formed in the process, methanol was used instead of chloride ions as the reducing agent. However, also with methanol and with sulfur dioxide a certain amount of chlorine is produced as chloride ions are involved in the reduction process. It is also common in these processes to add a small amount of chloride ions, in the form of sodium chloride or hydrochloric acid to increase the efficiency. Formerly the chlorine by product has been utilized in the paper mills but due to increased environmental demands there is a decreasing need for chlorine.

The change over from chloride ions to methanol as the reducing agent also resulted in the disadvantage of formation of other by-products than chlorine in the reaction system. The reaction according to formula [2] above does only represent the theoretical methanol oxidation. However, in practical production inefficiencies in the methanol oxidation bring about the formation of formaldehyde and formic acid and probably also ethers and esters along with the carbon dioxide. It could be expected that reactions can occur in the bleaching train with these by-products resulting in chlorinated organic compounds.

Besides the draw back with formation of chlorine and other by-products, the old R-2, Solvay and Mathieson processes also have the disadvantage of low efficiency and low production rates. The efficiency for a normal Mathieson process calculated as chlorate transformed into chlorine dioxide is typically not more than about 88%.

To increase the efficiency of these processes it was suggested to run the processes in a single vessel under sub-atmospheric pressure. Chlorine dioxide is then generated continuously together with the evaporated aqueous reaction medium. The alkali metal sulfate by-product is crystallized. This process is disclosed e.g. in U.S. Pat. No. 4,081,520. This process and similar "single vessel process" ("SVP" processes) technologies generally increase the efficiency to acceptable levels while maintaining low levels of chlorine effluent. Patents issued after the above mentioned describe different embodiments attempting to optimize the process with as low chlorine production as possible.

Another reducing agent suggested in the state of the art for chlorine dioxide production is hydrogen peroxide. U.S Pat. No. 2,332,181 discloses a batch process for chlorine dioxide production of substantially pure chlorine dioxide with respect to chlorine with hydrogen peroxide as the reducing agent. The process must be run at a low temperature and with low concentrations in the reactor to avoid explosive decomposition. Other patents suggest a combination of hydrogen peroxide and chloride ions as the reducing agent. This combination has the disadvantage of chlorine formation. In U.S. Pat. No. 5,091,167 the applicant found that it was possible to produce chlorine dioxide continuously with high efficiency with hydrogen peroxide as the reducing agent in a chlorine free process with the SVP technology.

However, there is still a need for developing chlorine dioxide processes at atmospheric pressure with good efficiency and production rate but with reduced production of chlorine byproduct as well as other by-products. For example there are a large number of existing plants with atmospheric pressure generators with poor efficiency and with capacity limitations. With increasing demand for chlorine dioxide bleaching, improvements of these plants would be of considerable interest. Also for the installation of new plants the atmospheric pressure process offers a low investment cost for the chlorine dioxide generator.

SUMMARY OF THE INVENTION

It is accordingly an object of the present invention to provide a chlorine dioxide process of high efficiency and high production rate. It is another object of the invention to provide a process wherein little or no chlorine is formed as a by-product. It is a further object of the invention to provide a process wherein no other detrimental by-products are formed.

The objects of the invention are achieved by a process, as claimed in the claims, for continuously producing chlorine dioxide at a pressure of about 400–900 mm Hg in a non-crystallizing process with hydrogen peroxide as the reducing agent. The acid normality in the aqueous reaction medium is from about 4 to about 14N and the chlorate concentration is between about 0.05 mole/l to about saturation. No substantial amount of chloride ions is added. It was surprisingly found that it was possible to produce chlorine dioxide safely with a high production rate and in a high yield in a non-crystallizing system using hydrogen peroxide and with no substantial addition of chloride ions if the chlorate concentration and the acid normality and the pressure was kept within the stated values.

DETAILED DESCRIPTION OF THE PREFERRED EMBODIMENTS

Preferably the process is run at a pressure about atmospheric pressure. It was found that it was not necessary to add any chloride ions for a steady production. Neither was there any problem with dangerous decomposition in spite of the reaction conditions being rather strong both in respect of chlorate concentration as well as acid normality and temperature. The process resulted in a very efficient process with a yield of more than 94%. As hydrogen peroxide was used as the reducing agent no substantial amount of chlorine was formed, neither any other detrimental by-products.

It was also found that the process has a lower cooling requirement than the state of the art processes. Due to the hydrogen peroxide reduced process being a heat consuming reaction the over all amount of heat that has to be removed by cooling is reduced considerably compared to for example the Mathieson and Solvay processes. Further, by operating at a slight sub-atmospheric pressure the evaporation rate of the water is increased. Thereby the heat from the system is removed and the need for external cooling is further reduced. In particular, the objects of the invention are achieved by a process for continuously producing chlorine dioxide by reacting an alkali metal chlorate, sulfuric acid or another chlorine free mineral acid such as phosphoric acid and hydrogen peroxide as reducing agent to produce chlorine dioxide in an aqueous reaction medium, characterized in that the chlorine dioxide is generated in at least one reaction step comprising at least one reaction vessel, by feeding alkali metal chlorate, acid, hydrogen peroxide and inert gas to said reaction vessel, in substantial absence of added chloride ions, maintaining the aqueous reaction medium in said reaction vessel at a pressure of from about 400 mm Hg to about 900 mm Hg and at a temperature of from about 35° C. to about 100° C. and at an acidity within a range from about 4 to about 14N and the chlorate concentration of between about 0.05 molar to saturation, withdrawing chlorine dioxide, oxygen and inert gas and the depleted aqueous reaction medium from said reaction zone without substantial crystallization of alkali metal sulfate.

It has been found that the concentration of chlorate in the reaction system is very important. By raising the chlorate concentration to higher levels than normal high production rates and high yields were obtained. The increase of the production rate was as much as two to three times compared to the atmospheric pressure systems known in the art. The possibility to use hydrogen peroxide as reducing agent in an atmospheric pressure system with higher than normal chlorate concentration and without chloride ions was unexpected as the state of the art either mentions the combination of hydrogen peroxide and chloride or very cautious reaction conditions. The high efficiency of the process also brings about the advantage with a low amount of produced by-product alkali metal sulfate.

The process according to the invention can be used in all types of known reaction equipments for atmospheric pressure reactions. Thus reactors normally used for Mathieson or Solvay or R-2 processes can be used. In the process according to the invention alkali metal chlorate, sulfuric acid, hydrogen peroxide and inert gas are continuously fed to the reaction vessel. Inert gas is added to the reaction vessel to obtain sufficient mixing and to maintain a safe partial pressure of the chlorine dioxide. With the hydrogen peroxide chemistry oxygen is formed in situ as the reaction proceeds. The oxygen bubbles formed create both mixing and dilution of the chlorine dioxide. Thereby the flow of inert gas can be reduced compared to prior art processes. This also enables part of the inert gas to be introduced to the top of the reaction vessel in order to decrease the foaming. Thus it is possible to reduce the amount of inert gas introduced into the bottom of the vessel. Usually the reaction is carried out in more than one reaction vessel. The depleted reaction medium is brought to a second (or more) reaction vessel with an additional amount of hydrogen peroxide and inert gas to further deplete the solution in respect of the alkali metal chlorate.

In a preferred embodiment of the present invention the process is carried out in two reaction steps. The first step comprises at least one reaction vessel with reaction conditions as stated above. At least a part of the depleted aqueous reaction medium from the first reaction step and alkali metal chlorate and hydrogen peroxide is brought to a second reaction step comprising a single reaction vessel. The reaction medium herein is maintained at a temperature of from about 50° C. to about 100° C. and the acidity within a range of from about 2 to about 5N. The reaction medium is subjected to sub-atmospheric pressure sufficient for evaporating water. A mixture of chlorine dioxide, oxygen and water vapour is withdrawn from an evaporation zone in said reaction vessel and neutral alkali metal sulfate is precipitated in a crystallization zone in said reaction vessel. By combining a reaction step which produces a depleted reaction medium with the SVP technology the acid content of the depleted reaction medium from the first reaction step can be used as acid medium in the SVP reaction vessel. As the process in the SVP reactor is run in a low acid normality range the precipitated alkali metal sulfate from the SVP reactor will be neutral, which is an advantage. Thus, with this combination of reaction steps there will be no depleted reaction medium to take care of but only a neutral sulfate salt. The combination as described is known in the state of the art as "cascading" of reaction vessels. However, it has not been made with hydrogen peroxide as the reducing agent. The advantages with "cascading" and hydrogen peroxide being a totally chlorine free system, a neutral salt by-product and a process with a commercially acceptable production also in the SVP reaction step. It is well known in the art that SVP processes, with other reducing agents, in the low acid normality range (2–5N) are too slow to be of commercial interest, at least without the aid of catalysts.

In a further embodiment of the present invention the depleted reaction solution from the first reaction step is fed to an electrolytic cell. Such a process is known in the state of the art e.g. from U.S. Pat. No. 4,129,484 the disclosure of which is incorporated herein by reference. Conventional cells could be used. A suitable electrolytic cell is equipped with an anode and a cathode and preferably at least one cationic membrane. The depleted reaction solution from the chlorine dioxide reaction vessel is fed to the anolyte compartment of the cell and withdrawn as an acid enriched reaction solution which can be recirculated to the chlorine dioxide reaction vessel. In the cathode compartment alkali metal hydroxide is formed. Thus with this proceeding it is possible to work up the depleted reaction solution into two useful streams, one being the enriched acid solution which can be brought back into the system and the other being the alkali metal hydroxide. By this method the alkali metal added to the chlorine dioxide reaction vessel can be withdrawn as a useful chemical in stead of as a by-product. Depending upon the choice of anode an additional cationic membrane can be used between the reaction solution compartment and the anode. With an additional membrane it is possible to avoid the oxidizing environment at certain anodes and to prolong the life time for the anodes. When an additional cationic membrane is used the anolyte and membrane used are suitably such which are insensitive to the oxidizing environment at certain anodes.

It is also possible to feed the precipitated alkali metal sulfate formed as a by-product from the SVP reaction vessel to an electrolytic cell in the same manner as mentioned above. In this embodiment the precipitated sulfate is dissolved and added as a solution to the electrolytic cell.

The production of chlorine dioxide according to the present process is performed by adding the alkali metal chlorate, sulfuric acid and hydrogen peroxide to the first reaction step. An aqueous reaction medium is maintained in the first reaction vessel with a chlorate concentration of from about 0.05 moles/l to saturation, preferably from about 0.09 to about 3.75 moles/l, most preferably from about 0.09 to about 1.1 moles/l. The acidity in the reaction medium should be within the range of from about 4 to 14N, preferably from about 6–12N, and most preferably from about 7.5–10N. Hydrogen peroxide is added in an amount of from about 0.16 to about 0.6 ton/ton chlorate, suitably from about 0.16 to about 0.32, preferably 0.16 to 0.22 ton/ton chlorate. Inert gas is introduced into the reaction vessel to provide agitation of the reaction medium but most of all to dilute the produced chlorine dioxide to a safe concentration. The amount of inert gas added is conventional, i.e. to maintain the partial pressure of the chlorine dioxide below about 100 mm Hg. The inert gas may be air, nitrogen, carbon dioxide or the process off-gas comprising oxygen and trace amounts of chlorine dioxide. The advantage of using the process off-gas as the inert gas is mainly that a relatively pure off-gas containing a high concentration of oxygen is generated. A further advantage is that the vent from the process will be reduced. Thus, it is a preferred embodiment to use the process off-gas as the inert gas.

The first reaction vessel is suitably operated at a temperature of 35° to 100° C., preferably from 45° C. to 70° C. and most preferably at 50° to 55° C. and at a pressure of from about 400 mm Hg to about 900 mm Hg, preferably from about 600 mm Hg to 800 mm Hg and most preferably from about 720 mm Hg to about 800 mm Hg. Thus it is preferred to operate at about atmospheric pressure. The reaction is a non-crystallizing reaction and a depleted reaction medium leaves the reactor without any substantial crystallization of the alkali metal sulfate.

The present process is an essentially chlorine free process. No substantial amount of chloride ions is added. On the contrary it was found that chloride ions had a detrimental influence on the process and led to a low hydrogen peroxide efficiency. The chlorate used in the process is conventional, commercially available, chlorate. By way of manufacturing such chlorate always contains a small amount of chloride. That amount of chloride is not more than about 0.5, often not more than about 0.05, preferably not more than about 0.02, most preferably not more than about 0.01 weight per cent of the alkali metal chlorate. Beside this amount of chloride being an impurity in the chlorate no further chloride is added. There is also commercially available chlorate with higher amounts of chloride. This type of chlorate has been obtained by adding extra alkali metal chloride to the chlorate. Such a chlorate is not suitable for the present process.

When the first reaction step is run in more than one reaction vessel such as in a conventional Mathieson process, the depleted reaction medium from the first reaction vessel is brought to a second (or more) reaction vessel. Inert gas and hydrogen peroxide are introduced and more chlorate in the depleted medium is converted to chlorine dioxide. The amount of added hydrogen peroxide in this second reactor is suitably up to 50% of the entire hydrogen peroxide required for reaction, and preferably only about 15% of the total amount required. The pressure in the second reactor is about atmospheric pressure and the temperature is the same as in the first reaction vessel. It is suitable to add heat to the second reactor to maintain the temperature at the stated value. This heat may be added by an external heater or by adding additional sulfuric acid to the second reactor.

In the non-crystallizing process inert gas is introduced in the reaction vessel, usually through the bottom, and chlorine dioxide and oxygen is liberated in the reaction medium. The introduction of inert gas bubbles in the medium as well as the release of gas bubbles of the reaction products brings about a tendency of foaming of the reaction medium, especially at higher rates. As mentioned above inert gas is introduced into the reaction vessel to dilute the chlorine dioxide formed to safe concentration. The total quantity of inert gas that must be added is then fixed depending on the value of the safe partial pressure of the chlorine dioxide formed. However the method and mode of injection of the dilution inert gas is not fixed. Normally all inert gas is introduced at the bottom of the vessel. In a preferred embodiment of the present invention only a portion of the inert gas needed is injected in the bottom of the reaction vessel and through the reaction medium. The rest of the inert gas is supplied to the space above the liquid level in the vessel. With this mode of introduction the foaming of the reaction medium can be reduced to a great extent or totally eliminated. The proportion of inert gas supplied to the space above the liquid level is suitably 80% of the total amount of inert gas, preferably 50% and most preferably 20%. A suitable mode of arrangement of this divided inert gas supply must insure that the chlorine dioxide and dilution inert gas are well mixed in the vapor space above the reaction liquid. This can be achieved with multiple injection points, spargets, or baffles.

Another measure that can be taken to minimize the tendency of foaming is to increase the holes in the sparget through which the inert gas is introduced.

In the embodiment with cascading the first reaction step with an SVP reaction vessel, at least a part of the depleted reaction medium from the first reaction step is brought to the single reaction vessel to provide a reaction medium with an acid strength of from about 2 to about 5N. The reaction conditions in the vessel are suitably as stated in U.S. Pat. No. 5,091,166, the disclosure of which is incorporated herein by reference. Thus, alkali metal chlorate concentration in the reaction vessel can vary within wide limits, from a low concentration of about 0.25M up to saturation, preferably from about 1.5M up to saturation, most preferably from about 2.5M up to saturation. Hydrogen peroxide can be added in amounts of from about 0.16 to about 0.6 ton/ton chlorate, preferably from about 0.16 to about 0.32 ton/ton chlorate, and most preferably from 0.16 to 0.22 ton/ton chlorate. The reactants are added continuously to the reactor. The reaction is suitably operated at a temperature of 50°–100° C., preferably 50°–75° C. and at a pressure below atmospheric pressure, suitably at 60–400 mm Hg. The reaction medium boils or water is evaporated in an amount sufficient to dilute the chlorine dioxide formed to a safe concentration. The acidity in the reactor is adjusted if necessary with extra sulfuric acid. In this reactor the alkali metal sulfate formed in the total process is continuously crystallized and separated in a suitable manner. Thus in stead of a depleted reaction medium as a by-product to take care of from the reactor the process in this embodiment produces a pure, neutral alkali metal sulfate.

The process is not restricted to any of the alkali metals, but sodium is the most preferred.

The invention is illustrated by means of the following example, where parts and percentages mean parts by weight and percentages by weight, unless otherwise specified.

EXAMPLE 1

To a laboratory chlorine dioxide generator a water solution of 64 g/liter chlorate was added with 382 g/liter sulfuric acid. A chlorate concentration of 0.38M and an acid strength of 7.8 N was thus maintained in the generator. 30% hydrogen peroxide solution was also added such that the hydrogen peroxide concentration in the reactor was 3.6 g/liter. The reactor was operated at atmospheric conditions and maintained at 60° C. The chlorine dioxide production rate was $1.4 \times 10^{-2}$ moles/(liter-minute). The predicted chlorine dioxide production rate was $1.44 \times 10^{-2}$ moles/(liter-minute).

EXAMPLE 2

To a laboratory chlorine dioxide generator a water solution of 64 g/liter chlorate was added with 502 g/liter sulfuric acid. A chlorate concentration of 0.13M and an acid strength of 10.2 N was thus maintained in the generator. 30% hydrogen peroxide solution was also added such that the hydrogen peroxide concentration in the reactor was 1.4 g/liter. The reactor was operated at atmospheric conditions and maintained at 60° C. The chlorine dioxide production rate was $2.16 \times 10^{-2}$ moles/ (liter-minute). The predicted chlorine dioxide production rate was $2.64 \times 10^{-2}$ moles/(liter-minute).

EXAMPLE 3

A commercial generator of 1400 gallons of liquid capacity in the primary reactor and 1400 gallons of liquid capacity in a secondary reactor in series produced 10 tons of chlorine dioxide per day utilizing traditional Solvay chemistry running at an acid normality of 9.5N and a chlorate concentration of 0.23M at the overflow of the first reactor. Changing the reducing agent to hydrogen peroxide allowed a production increase to 18 tons of chlorine dioxide per day when operated at 8N and 30 tons of chlorine dioxide per day when operated at 10N with a chlorate concentration of 0.83M in both cases at the overflow of the first reactor.

What is claimed is:

1. A process for continuously producing chlorine dioxide by reacting an alkali metal chlorate, sulfuric acid or another chlorine free mineral acid and hydrogen peroxide as reducing agent to produce chlorine dioxide in an aqueous reaction medium, comprising the steps of (a) generating chlorine dioxide in two reaction steps by feeding alkali metal chlorate, acid, hydrogen peroxide and inert gas in the substantial absence of added chloride ions to the first reaction step comprising at least one reaction vessel, (b) maintaining the aqueous reaction medium in said reaction vessel at a pressure of from about 400 mm Hg to about 900 mm Hg, at a temperature of from about 35° C. to about 100° C., at an acidity within a range from about 4 to about 14N and at a chlorate concentration of between about 0.05 molar and saturation, (c) withdrawing chlorine dioxide, oxygen, inert gas and a depleted aqueous reaction medium from said first reaction step without substantial crystallization of alkali metal sulfate, said steps (a), (b) and (c) being conducted under non-crystallizing condition, (d) feeding at least a part of said depleted aqueous reaction medium, alkali metal chlorate and hydrogen peroxide to a second reaction step comprising a single reaction vessel, (e) maintaining the reaction medium at a temperature of from about 50° C. to about 100° C. and at an acidity within a range of from about 2 to about 5N and subjecting the reaction medium to sub-atmospheric pressure sufficient for evaporating water, (f) withdrawing a mixture of chlorine dioxide, oxygen and water vapor from an evaporation zone in said reaction vessel and (g) precipitating neutral alkali metal sulfate in a crystallization zone in said reaction vessel.

2. The process according to claim 1, wherein the chlorine dioxide is produced at a pressure of from about 600 to about 800 mm Hg in the first reaction step.

3. The process according to claim 2, wherein the chlorine dioxide is produced at about atmospheric pressure.

4. The process according to claim 1, wherein the chlorate concentration is between about 0.09 to about 3.75 moles/l in the first reaction step.

5. The process according to claim 1, wherein the acidity is within a range of from about 6–12N in the first reaction step.

6. The process according to claim 1, wherein the acidity is within a range of from about 7.5–10N.

7. The process according to claim 1, wherein the first reaction step comprises two or more reaction vessels and the depleted aqueous reaction medium from the first reaction vessel is brought to at least a second reaction vessel for further reaction with addition of hydrogen peroxide.

8. The process according to claim 1, wherein the first reaction step a portion of the inert gas is injected in the bottom of the reaction vessel and through the reaction medium and the rest of the inert gas is supplied to the space above the liquid level in the vessel.

9. The process according to claim 1, wherein the inert gas is a process off-gas.

10. The process according to claim 1, wherein the inert gas is air.

11. The process according to claim 1, wherein precipitated alkali metal sulfate is dissolved and added as a solution to an electrolytic cell.

12. A process for continuously producing chlorine dioxide by reacting an alkali metal chlorate, sulfuric acid or another chlorine free mineral acid, and hydrogen peroxide as reducing agent to produce chlorine dioxide in an aqueous reaction medium, comprising the steps of (a) generating chlorine dioxide in at least one reaction step comprising at least one reaction vessel, by feeding alkali metal chlorate, acid, hydrogen peroxide and inert gas to said reaction vessel in the substantial absence of added chloride ions, (b) maintaining the aqueous reaction medium in said reaction vessel at a pressure of from abut 400 mm Hg to about 900 mm Hg, at a temperature of from about 35° C. to about 100° C., at an acidity of from about 4 to about 14N and at a chlorate concentration of between about 0.05 moles/1 and saturation, (c) withdrawing chlorine dioxide, oxygen, inert gas and a depleted aqueous reaction medium from said reaction vessel without substantial crystallization of alkali metal sulfate, said steps (a), (b) and (c) being conducted under non-crystallizing condition, (d) further reacting depleted aqueous reaction medium from step (c) in another reaction vessel with addition of hydrogen peroxide.

* * * * *

US005380517B1

REEXAMINATION CERTIFICATE (3709th)

United States Patent [19]

Sokol

[11] B1 5,380,517

[45] Certificate Issued  Jan. 19, 1999

[54] PROCESS FOR CONTINUOUSLY PRODUCING CHLORINE DIOXIDE

[75] Inventor: John C. Sokol, Marietta, Ga.

[73] Assignee: Eka Nobel Inc., Marietta, Ga.

Reexamination Request:
No. 90/004,618, May 1, 1997

Reexamination Certificate for:
Patent No.: 5,380,517
Issued: Jan. 10, 1995
Appl. No.: 23,561
Filed: Feb. 26, 1993

[51] Int. Cl.$^6$ .................................................. C01B 11/02
[52] U.S. Cl. .................................. 423/478; 252/187.21
[58] Field of Search ...................... 423/478; 252/187.21

[56] References Cited

U.S. PATENT DOCUMENTS

| | | | |
|---|---|---|---|
| 2,332,181 | 10/1943 | Soule | 423/478 |
| 2,484,402 | 10/1949 | Day et al. | 423/478 |
| 2,833,624 | 5/1958 | Sprauer | 423/478 |
| 3,341,287 | 9/1967 | Scribner | 423/478 |
| 3,341,288 | 9/1967 | Partridge | 423/478 |
| 3,562,702 | 2/1971 | Partridge | 423/478 |
| 4,081,520 | 3/1978 | Swindells et al. | 423/478 |
| 4,129,484 | 12/1978 | Larsson | 423/478 |
| 4,421,730 | 12/1983 | Isa et al. | 423/478 |
| 5,091,166 | 2/1992 | Engström et al. | 423/478 |
| 5,091,167 | 2/1992 | Engström et al. | 423/478 |
| 5,273,733 | 12/1993 | Winters et al. | 423/478 |
| 5,486,344 | 1/1996 | Winters et al. | 423/477 |

FOREIGN PATENT DOCUMENTS

| | | |
|---|---|---|
| 997858 | 1/1952 | France . |
| 63-8203 | 1/1988 | Japan ............................ 423/478 |
| 3-115102 | 5/1991 | Japan . |

OTHER PUBLICATIONS

Japan Carlit Co, Ltd. "Chlorine Dioxide Generation Systems", pp. A501237–A501246 (no date).

Fromherz et al, "French–English Chemical Terminology", 1968 (no month) pp. 80–81.

DeVries, "French–English Science & Technology Dictionary", $4^{th}$ ed., (no date) p. 359.

Singh, "The Bleaching of Pulp", $3^{rd}$ ed. Revised, 1979 (no month) pp. 628–639.

Weigert, "Wasserstoffperoxid und seine Derivate", (no date), pp. 30–32.

*Primary Examiner*—N. M. Nguyen

[57] ABSTRACT

A process for continuously producing chlorine dioxide by reacting an alkali metal chlorate, sulfuric acid or another chlorine free mineral acid and hydrogen peroxide as reducing agent to produce chlorine dioxide in an aqueous reaction medium. In the process chlorine dioxide is generated in at least one reaction step comprising at least one reaction vessel, by feeding alkali metal chlorate, acid, hydrogen peroxide and inert gas to said reaction vessel, in substantial absence of added chloride ions. The aqueous reaction medium in said reaction vessel is maintained at a pressure of from about 400 mm Hg to about 900 mm Hg and at a temperature of from about 35° C. to about 100° C. and at an acidity within a range from about 4 to about 14 N and the chlorate concentration of between about 0.05 moles/1 saturation. Chlorine dioxide, oxygen and inert gas and the depleted aqueous reaction medium is withdrawn from said reaction zone without substantial crystallization of alkali metal sulfate.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–12 are cancelled.

New claims 13–28 are added and determined to be patentable.

*13. An essentially chlorine free process for continuously producing chlorine dioxide by reacting an alkali metal chlorate, sulfuric acid or another chlorine free mineral acid, and hydrogen peroxide as reducing agent to produce chlorine dioxide in an aqueous reaction medium, comprising the steps of (a) generating chlorine dioxide in a first reaction vessel, by feeding alkali metal chlorate, acid hydrogen peroxide and inert gas to said first reaction vessel wherein the total amount of chloride added is not more than about 0.5 wt. % of the alkali metal chlorate, (b) maintaining the aqueous reaction medium in said reaction vessel at a pressure of from about 400 mm Hg to about 900 mm Hg, at a temperature of from about 35° C. to about 100° C., at an acidity of from about 4 to about 14N and at a chlorate concentration of between about 0.05 moles/l and saturation, (c) withdrawing chlorine dioxide, oxygen, inert gas and a depleted aqueous reaction medium from said reaction vessel without substantial crystallization of alkali metal sulfate, said steps (a), (b) and (c) being conducted under non-crystallizing conditions, and (d) further reacting depleted aqueous reaction medium from step (c) in a second reaction vessel with addition of hydrogen peroxide, in the substantial absence of added chloride ions, and under non-crystallizing conditions.*

*14. The process according to claim 13, wherein the chlorine dioxide is produced at a pressure of from about 600 to about 800 mm Hg in the first reaction vessel.*

*15. The process according to claim 14, wherein the chlorine dioxide is produced at about atmospheric pressure in the first reaction vessel.*

*16. The process according to claim 13, wherein the chlorate concentration is between about 0.09 to about 3.75 moles/l in the first reaction vessel.*

*17. The process according to claim 13, wherein the acidity is within a range of from about 6–12N in the first reaction vessel.*

*18. The process according to claim 13, wherein the acidity is within a range of from about 7.5–10N in the first reaction vessel.*

*19. The process according to claim 13, wherein a portion of the inert gas is injected in the bottom of the first reaction vessel and through the reaction medium and the rest of the inert gas is supplied to the space above the liquid level in the first reaction vessel.*

*20. The process according to claim 13, wherein the inert gas is a process off-gas.*

*21. The process acording to claim 13, wherein the inert gas is air.*

*22. The process according to claim 13, wherein the chlorate concentration in the reaction medium of the first reaction vessel is maintained from about 0.05 moles/l to about 1.1 moles/l.*

*23. The process according to claim 13, wherein the amount of chloride added is not more than about 0.05 weight % of the alkali metal chlorate.*

*24. The process according to claim 13, wherein the amount of chloride added is not more than about 0.02 weight % of the alkali metal chlorate.*

*25. The process according to claim 13, wherein the amount of chloride added is not more than about 0.01 weight % of the alkali metal chlorate.*

*26. The process according to claim 13, wherein the temperature of the reaction medium in the first reaction vessel is maintained from 45° to 70° C.*

*27. The process according to claim 13, wherein up to 50% of the entire amount of hydrogen peroxide added to said process is added to the second reaction vessel.*

*28. The process according to claim 13, wherein the process is steady state.*

* * * * *